US007733906B2

(12) United States Patent
Raman et al.

(10) Patent No.: US 7,733,906 B2
(45) Date of Patent: Jun. 8, 2010

(54) METHODOLOGY FOR NETWORK PORT SECURITY

(75) Inventors: Anant Raman, Chandler, AZ (US); Sanjay Rungta, Phoenix, AZ (US)

(73) Assignee: Intel Corporation, Santa Clara, CA (US)

( * ) Notice: Subject to any disclaimer, the term of this patent is extended or adjusted under 35 U.S.C. 154(b) by 967 days.

(21) Appl. No.: 11/170,854

(22) Filed: Jun. 30, 2005

(65) Prior Publication Data

US 2007/0002899 A1    Jan. 4, 2007

(51) Int. Cl.
H04J 3/16 (2006.01)
(52) U.S. Cl. .............................. 370/469; 709/223; 726/4
(58) Field of Classification Search ............... 726/4, 726/5, 6; 713/155, 169; 709/223; 340/5.2; 370/469
See application file for complete search history.

(56) References Cited

U.S. PATENT DOCUMENTS

| 5,081,623 | A  | * | 1/1992 | Ainscow ............... 370/451 |
| 6,609,198 | B1 | * | 8/2003 | Wood et al. ............ 713/155 |
| 7,065,737 | B2 | * | 6/2006 | Phan et al. ............. 716/19 |
| 7,194,554 | B1 | * | 3/2007 | Short et al. ............ 709/246 |
| 7,284,062 | B2 | * | 10/2007 | Krantz et al. .......... 709/229 |
| 7,287,077 | B2 | * | 10/2007 | Haugh et al. ........... 709/225 |
| 7,358,494 | B1 | * | 4/2008 | Gao et al. ............. 250/310 |
| 2003/0041151 | A1 | * | 2/2003 | Senapati et al. ........ 709/229 |
| 2003/0200321 | A1 | * | 10/2003 | Chen et al. ........... 709/229 |
| 2004/0003072 | A1 | * | 1/2004 | Mathew et al. ......... 709/223 |
| 2004/0158735 | A1 | * | 8/2004 | Roese ................. 713/200 |
| 2004/0268140 | A1 | * | 12/2004 | Zimmer et al. ......... 713/200 |
| 2005/0010811 | A1 | * | 1/2005 | Zimmer et al. ......... 713/201 |
| 2005/0027837 | A1 | * | 2/2005 | Roese et al. .......... 709/223 |
| 2005/0125692 | A1 | * | 6/2005 | Cox et al. ............. 713/201 |
| 2005/0138377 | A1 | * | 6/2005 | First et al. ........... 713/169 |
| 2006/0055508 | A1 | * | 3/2006 | Kumar et al. .......... 340/5.2 |
| 2006/0136555 | A1 | * | 6/2006 | Patrick et al. ......... 709/203 |

OTHER PUBLICATIONS

IEEE Std 802.1X-2001, Port-Based Network Access Control, IEEE Computer Society, Oct. 25, 2001, American National Standards Institute, Institute of Electrical and Electronics Engineers, Inc. ISBN 0-7381-2626-7 SH94940, p. 26.*
U.S. Patent Application entitled "Integrated Security Framework", Inventor—Anant Raman, U.S. Appl. No. 10/883,351, filed Jun. 30, 2004 (Intel Ref. No. P19473).

* cited by examiner

Primary Examiner—Derrick W Ferris
Assistant Examiner—Stephen W Brown
(74) Attorney, Agent, or Firm—Blakely, Sokoloff, Taylor & Zafman LLP

(57) ABSTRACT

A system has a local area network, and software to automatically evaluate a network layer address, a lower layer address, a network port identifier, and/or a domain name of an equipment interface that is to be connected to the network. The software is to determine whether one of these matches an expected value for the network. The software is to provide a credential for each equipment interface that is authorized to connect to the network and that has been authenticated by the software. The credential contains a lower layer address, a network layer address, a domain name, and a network port identifier. Other embodiments are also described and claimed.

20 Claims, 6 Drawing Sheets

METHODOLOGY FOR NETWORK PORT SECURITY

An embodiment of the invention is directed to a method for securing access to a data network, and more particularly to securing access to a network whose members do not comply with IEEE 802.1x capabilities for controlling access to a network. Other embodiments are also described and claimed.

BACKGROUND

The old model of a single computer serving all of an organization's computational needs has in many instances been replaced by one in which a number of separate but interconnected computers provide similar functionality. Such interconnected systems are referred to as computer networks. One benefit of the computer network is it allows resource sharing, such as making a particular piece of equipment including its programs and data available to anyone that is connected to the network, without regard to the physical location of the resource and the user. A network may also provide high reliability, by having alternative sources of supply. For example, files could be replicated on two or more machines, so if one of them is unavailable due to a failure, the other copies could be used. When the computers of a network are typically located in a single room, building or campus, the network is referred to as a local area network (LAN). With advances in network technology, LANs can span multiple geographies, thereby earning the name Virtual LAN or VLAN for short. The terms LAN and VLAN are practically interchangeable. End user computers are connected to LANs via passive devices commonly referred to as Telecommunication Outlets (TOs). TOs are typically pre-wired to network equipment, the latter being stored in network closets or data centers for security purposes. With the end user connection to the TO, the physical connection to a network is now established, and through VLAN technology (software), the end user computer can be placed in different LANs without physically rewiring the network. This is in contrast with a wide area network (WAN) that is also referred to as a long haul network spanning multiple cities, countries, or continents.

To reduce their design complexity, most networks are organized as a series of layers or levels, each one built upon its predecessor. The purpose of each layer is to offer certain services to the higher layers, shielding those layers from the details of how the offered services are actually implemented. Layer N on one machine carries a conversation with layer N on another machine across a network. Rules and conventions used in this conversation may be known as the layer N protocol. Peer processes, in the same layer but in different machines, communicate with each other through the lower layers of the network, using their common layer protocol.

A popular network model is the Transmission Control Protocol/Internet Protocol (TCP/IP) reference model. This model defines four layers, beginning at the lowest layer, the physical layer, followed by data link layer, the network layer and the transport layer. The physical layer is concerned with transmitting raw bits over a communication channel. While the physical layer merely accepts and transmits a stream of bits without regard to meaning or structure (electrical signals), the data link layer is to create and recognize frame or packet boundaries (like Ethernet, Token Ring, and Asynchronous Transfer Mode or ATM). A computer uses a network interface controller or card (NIC) to connect to a network.

A medium access control (MAC) sublayer has been defined, as a sublayer of the data link layer. The MAC sublayer defines how two nodes may communicate with each other over a broadcast channel of the network. When node A wishes to send a packet to node B in the same LAN, a frame is generated by the network interface of node A that includes in addition to the payload data (received from the higher layers in node A) a destination MAC address, and a source MAC address. This ensures that the nodes A and B can send and receive frames from and to each other.

To send a packet from one network to a different network, each end node may require a MAC address (such as an Ethernet Address) and a network layer address (such as the Internet Protocol Address or IP Address) that identifies the end node in the network it is connected. Thus, a piece of equipment that is connected to a network and that is to also be accessible from a different network, will be assigned not only a MAC address to identify itself within its local network, but also a network layer address such as an Internet protocol address (IP) address that allows inter-network communications.

Network security deals with how to prevent unauthorized computer access to a network. Typically, once a device has been attached to a network (either by a wired or wireless link), it is treated as an authenticated member of the network and may be authorized to access most, if not all, resources that are in that network. Security protocols have been devised to ensure that only authorized devices can connect to a network. For example, the IEEE 802.1x security protocol is used to identify and authenticate a device (and its user) to connect to a network. See Institute of Electrical and Electronics Engineers, IEEE Standard 802.1x, Jun. 14, 2001 (http://standards-.ieee.org). Typically, the 802.1x network software may be running in a switch that is at the edge of the network, and also requires that the appropriate software components be present in every member device that is to be connected to the network.

Although the IEEE 802.1x protocol allows wireless members, such as notebook/laptop computers, to easily roam, from being connected to one wireless network to being connected to another, all the while permitting the user to access the different networks without additional login or authentication procedures, the protocol is not supported by many older network equipment and member devices connected to a network (also referred to as legacy networks).

BRIEF DESCRIPTION OF THE DRAWINGS

The embodiments of the invention are illustrated by way of example and not by way of limitation in the figures of the accompanying drawings in which like references indicate similar elements. It should be noted that references to "an" embodiment of the invention in this disclosure are not necessarily to the same embodiment, and they mean at least one.

DETAILED DESCRIPTION

Figure 1:
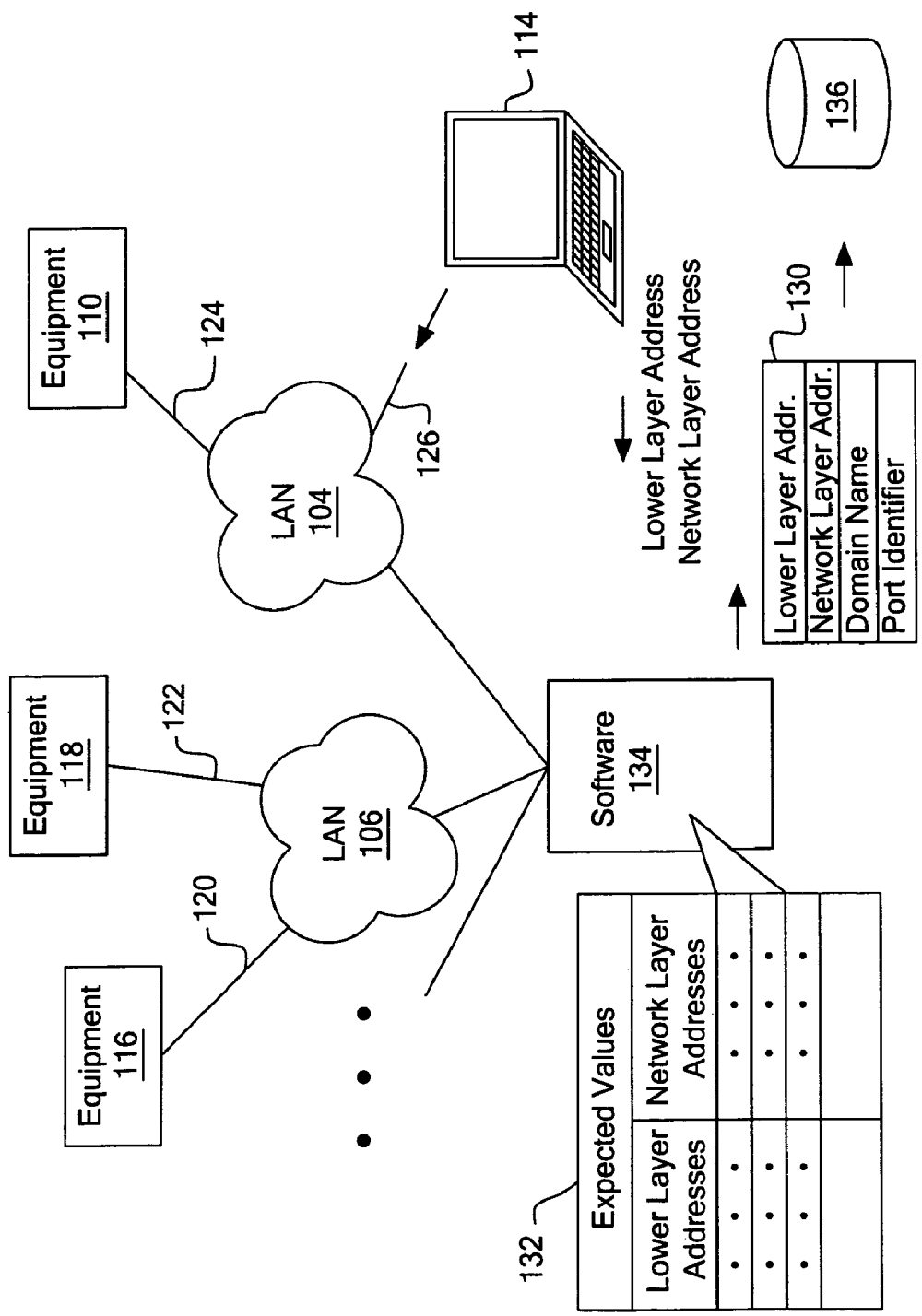
FIG. 1 is a block diagram of a network environment configured according to an embodiment of the invention.

FIG. 1 is a block diagram of a network environment configured according to an embodiment of the invention. In this embodiment, there are at least two LANs, 104, and 106 with software 134 to secure the LANs from unauthorized access (however, there could be as few as just one LAN). Connected to LAN 104, via network port 124, is equipment 110. Equipment 110 has a network interface (also referred to as equipment interface, not shown) that has assigned to it a network layer address and a lower layer address (lower than the network layer). Equipment 110 and/or its interface is a member of LAN 104, so that its lower layer and network layer addresses will appear as part of a list of expected values 132 that have been provided to the software 134. The list of expected values 132 may be manually entered by a network administrator or available from system information such as the Domain Name System (DNS), and stored for access by the software 134. Similarly, LAN 106 has two pieces of authorized equipment 116, and 118 that are connected via network ports 120, and 122. Lower and network layer addresses for the respective interfaces of equipment 116 and 118 will also appear as part of the expected values 132. According to an embodiment of the invention, the expected values refer to equipment interfaces that do not comply with or do not have the IEEE 802.1x capabilities for network security and controlling access to a network.

FIG. 1 also shows a further piece of equipment 114 (in this case a notebook/laptop computer with a wired or wireless network interface) that is to be connected to the LAN 104. As an example, a user of the equipment 114 may have attached an Ethernet socket that is built into the equipment 114 to an Ethernet socket that is in an access layer switch, a bridge, or a router (not shown) that is at the edge of the LAN 104. This attachment may be deemed part of a network port 126 over which the equipment 114 could be connected to the LAN 104. For wireless devices, the network port may have been assigned to a wireless access point, in order to connect the wireless network interface controller of mobile equipment to the network.

Once the equipment 114 has been attached to the LAN 104, the software 134 will "see" a lower layer address of the network interface of the equipment 114, and can obtain via conventional techniques, a network layer address that may have been assigned to that interface, e.g. using the Address Resolution Protocol (ARP) Cache. The software 134 then determines whether those addresses match any of the expected values 132 for LAN 104. Recall that the expected values 132 refer to those devices that are authorized to access the LAN 104. If the software should determine that the addresses from equipment 114 match with a pair of addresses in the expected values 132, then the software provides a credential 130 that is assigned to the interface of the equipment 114. This credential will contain the lower layer address, the network layer address, and a domain name associated with the network layer address. In addition, a network port identifier is also included in the credential 130, that points to the port 126 by way of which the equipment 114 will be connected to the LAN 104. With its credential 130 filled or "mapped" in this manner, including the four elements shown, the software 134 may then lock the port 126 to allow only the equipment 114 to connect to the network via that port. The credential 130 may be stored in a database 136 along with credentials for other authorized devices that can access LAN 104.

The software 134 may also be given the capability to perform a similar procedure with respect to securing the LAN 106. Lower layer addresses and network layer addresses of devices that are authorized to access LAN 106 (as well as their respective, assigned network port identifiers) may also be added to the list of expected values 132. Credentials for those devices may also be stored in the database 136. This information in the database 136 is separate from the expected values 132 and may be used to verify which among the currently connected devices to the networks have been authenticated. If a credential, including all of its four elements is present, then the device associated with that credential is not only connected to the network but is also an authorized device.

It should be noted that the software is to automatically make the evaluation described above, without requiring, for example, a network administrator to manually enter the address or port information that is considered. The software may be triggered to perform the procedure each time a new device is attached to an access layer switch, bridge, router, or other attachment point of a network.

Note that the functionality described above for the software 134 may be sufficient to secure the networks, without having to modify or add to any software components that are running in the individual pieces of equipment 110, 116, 118, and 114. None of the pieces of equipment needs to comply with the more recent network security protocols including, for example, the IEEE 802.1x.

Figure 2:
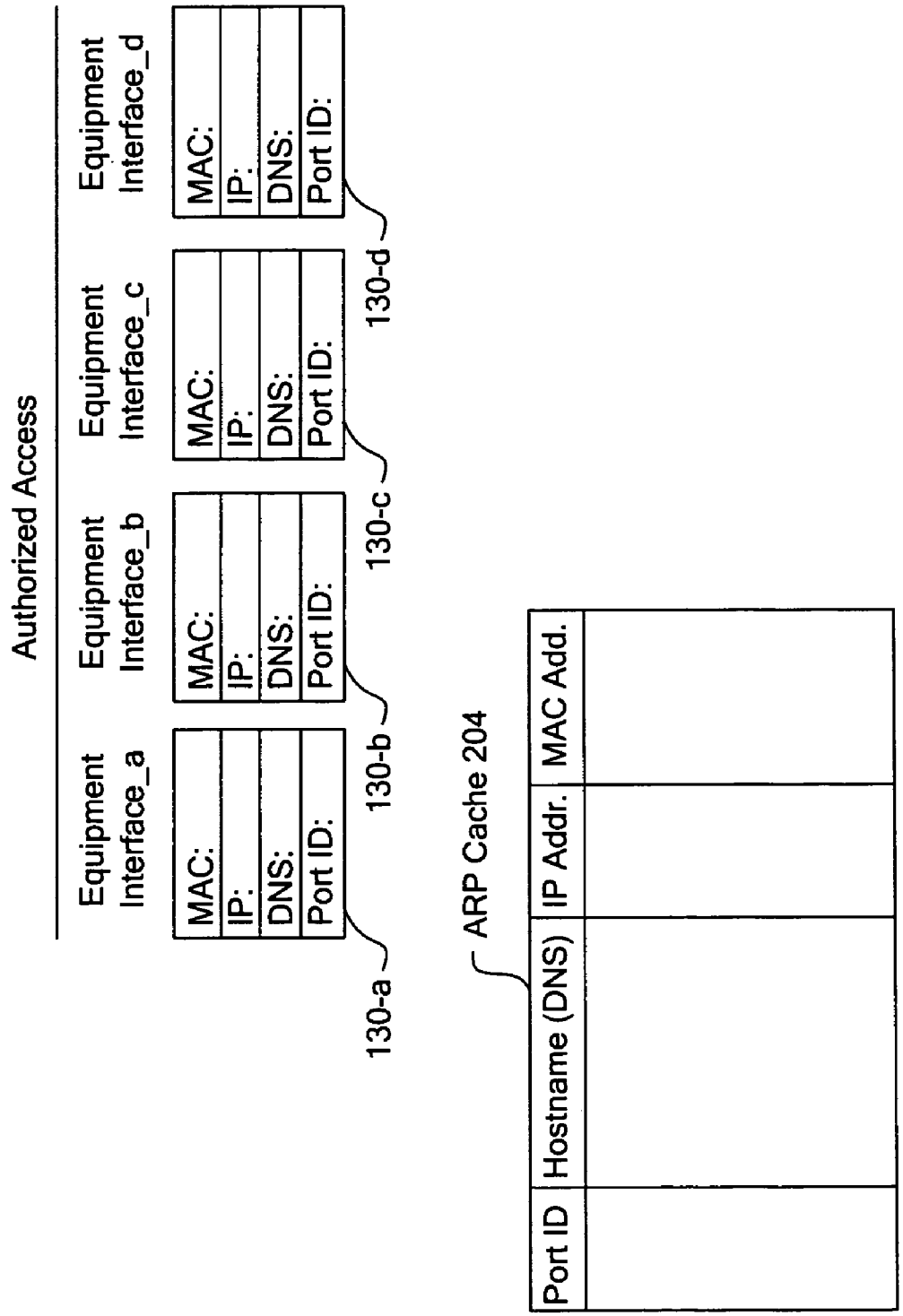
FIG. 2 shows a number of network credentials that are used by software in accordance with an embodiment of the invention, to authorize access to a network.

Turning now to FIG. 2, the software 134 may have the knowledge of a number of credentials 130_a, 130_b, etc. In this case four such credentials are shown, that are assigned to four expected devices, correspondingly. As mentioned above, these credentials 130 may be stored in the database 136 that is accessible by the software 134. In this example, the elements of each credential 130 include a MAC address as the lower layer address, and an IP address as the network layer address. In addition, the domain element is a Domain Name Service, DNS, name that may be obtained from a typical system Transport Control Protocol/Internet Protocol (TCP/IP) Hostname table. The table may be in an Address Resolution Protocol (ARP) cache 204, which is a standard component of routers, that is aware of the lower layer network addresses and their corresponding network layer addresses. The table of lower layer and network layer addresses are used for at least two purposes. First, when a TCP/IP end node connects to the TCP/IP network to identify/announce itself, it accesses the table. Second, the table helps find the lower layer address of a device with a known network layer address. The software uses the ARP cache 204 entries to build its database in part.

The software 134, after obtaining the MAC address from a new device that seeks to be connected to a network, may look up the MAC and/or IP addresses in the ARP cache 204, to obtain their associated host name (DNS name) with the network layer address as the key. The DNS name may then be provided as part of the credential 130, for storage in the database 136.

Figure 3:
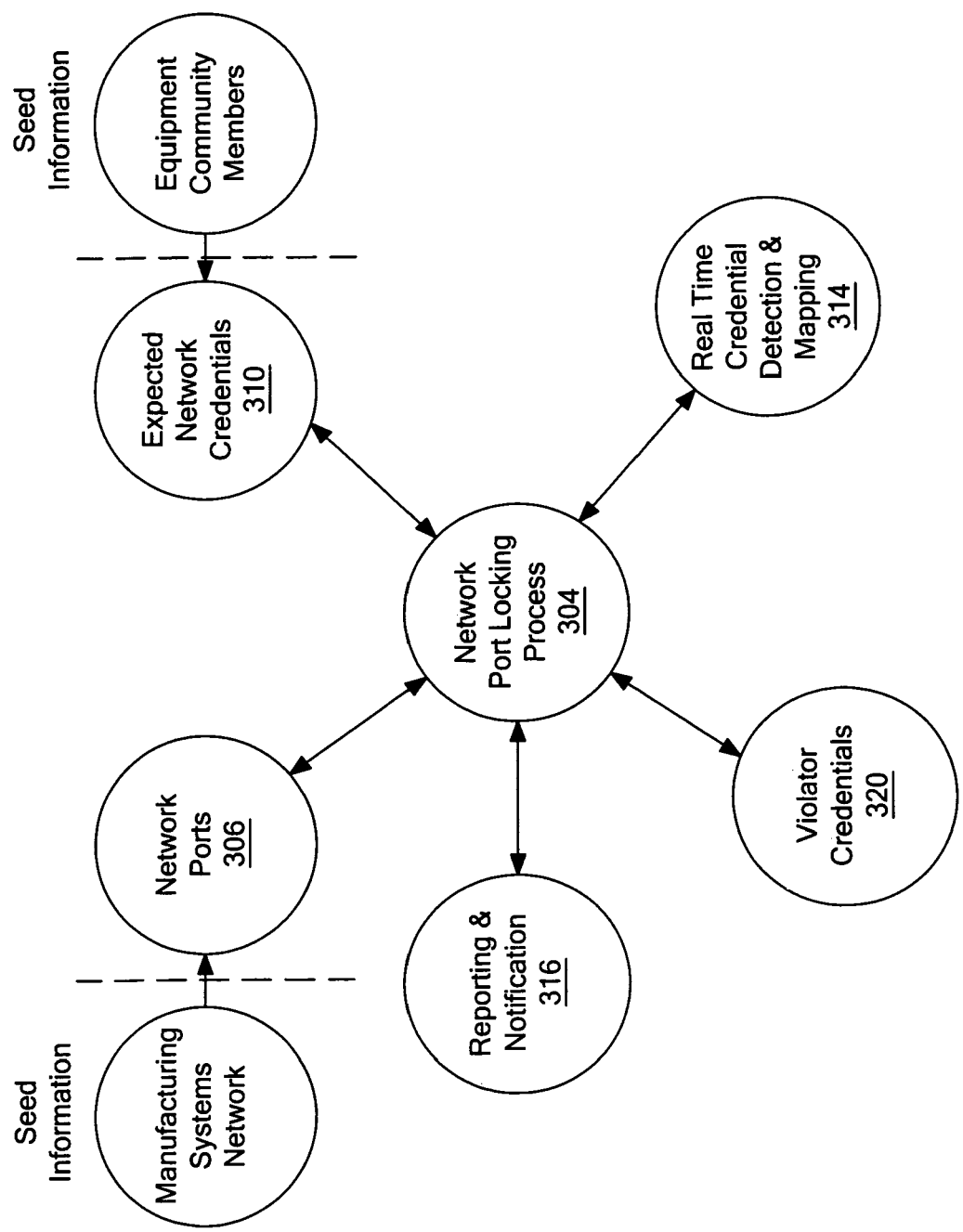
FIG. 3 illustrates a network port locking system and its components, according to an embodiment of the invention.

Turning now to FIG. 3, FIG. 3 illustrates a network port locking system and its components, according to an embodiment of the invention. The components of the system include a network port locking process 304 that is designed to be able to lock an assigned network port with the network credential of an authorized equipment interface (that is seeking to connect to one of its networks physically via its associated network port). The system also has expected network credentials 310 that are to be filled by or mapped, by a real-time credential detection and mapping process 314. The process 314 automatically obtains information about equipment interfaces that are newly attached to one of the networks, using, for example, a TCP/IP ARP Cache. The port locking process 304 locks one of the network ports 306 with the network credential 310 of an equipment interface that is seeking to connect and that has been authenticated by the credential detection and mapping process 314.

The system depicted in FIG. 3 may also have a reporting and notification process 316 that provides network administrators with either textual or other visual confirmation of the expected network interfaces that are seen on the network and have been appropriately locked down. Additionally, the system may also report on inconsistencies between the expected configuration and the actual one, by providing a list of violator credentials 320. Since the expected values include network port identifiers, which are associated with physically known locations (e.g. TO ports) at which equipment is allowed to attach to a network, the physical location of a violator can also be reported as part of a violator credential. An example data structure for the network credentials is described below, followed by set notation details of an example network port locking system.

Expected Network Credentials

Network credentials may be hierarchical in nature. At an upper level of the hierarchy, an equipment community is defined as a set of equipment instances. An equipment instance may refer to a single computer. Every piece of equipment may have a set of one or more network interfaces. Each network interface has a credential. Each credential includes a set of elements, for example, the four elements of a network layer address, a lower layer address, a domain name, and a network port identifier. In set notation, these may be represented as:

$C_n = \{E_1, E_2, E_3, E_4, \ldots E_n\}$ where $C_n$ is a set of equipment.
$E_m = \{I_1, I_2, I_3, I_4, \ldots I_m\}$ where $E_m$ is a set of network interfaces.
$I_p = \{Cr_1, Cr_2, Cr_3, Cr_4, \ldots Cr_p\}$ where $I_p$ is a set of credentials.

In the example embodiment where the network layer address is an IP address, and the lower layer address is a MAC address, a credential may be given by the expression:

$$Cr_q = \{\text{DNS Name, IP Address, MAC Address, Network Port}\} \quad (1)$$

where $Cr_q$ is a set that includes the DNS name, IP address, MAC address and network port.

The credentials of the member equipment instances are termed "expected" network credentials, because in a community setting, these may be the only interfaces that are expected to be in the network for the community.

Network Ports

As described above, with respect to FIG. 1, a VLAN for a community may have a set of dedicated, network ports, one for each equipment interface. In set notation, this may be described as:

$V_m = \{P_1, P_2, P_3, P_4, \ldots P_m\}$ where $V_m$ is a set of m network ports one for each equipment interface I.
$P_i = \{M_1, M_2, M_3, M_4, \ldots M_i\}$ where $P_i$ is the set of MAC addresses seen or detected on each port.

The network ports 306 may be defined as part of the seed information in view of the network environment. In this case, the seed information refers to a manufacturing systems network.

Real-Time Credential Detection and Mapping

The real-time credential detection and mapping process 314 is a system component that detects the configured, IP address and MAC address of an attached equipment interface, from a TCP/IP network system in this case. Additionally, each network port may be able to detect the one or more MAC addresses that are attached to it. The process 314 fills or maps the expected credentials for all authorized devices. As an example, the mappings may include:

$EC_i = \{\text{DNS Name}_i, \text{IP Address}_i\}$ where $EC_i$ has the expected DNS and IP address obtained using a DNS table. Also, the following mapping may be available:

$AC_j = \{\text{IP Address}_j, \text{MAC Address}_j\}$ where $AC_j$ is the actual IP address and MAC address, mapped from a TCP/IP ARP cache for example. These are the actual IP address and MAC address of an equipment interface that is attached and seeks to be connected to the network. Based on the foregoing, the real-time credential mapping may be performed as follows:

$$\begin{aligned} Cr_i = &\{\text{DNS Name}_j, \text{IP Address}_i, \text{MAC Address, Network Port}_i)|\text{IP Address}_i \in \{EC_i \text{ and } AC_i\} \text{ and} \\ & \text{MAC Address}_i \in \{AC_i \text{ and } V_i\} \text{ and Network Port}_i \\ & \in \{V_i\} \text{ and DNS Name=hostname (IP Address)}\} \end{aligned} \quad (2)$$

Note that in expression (2) above, hostname ( ) may be a generic function or library call that provides a domain name, for a given IP address.

The above two expressions (1), and (2) for performing the mapping of $Cr_i$ may be viewed as follows. If the actual IP address and the actual MAC address of a newly attached device match expected IP and MAC addresses, then the mapping above provides or fills in all four elements of an interface credential, as given in expression (2) above. As can be seen, mapping the complete set of expected devices for a network takes time to develop, as all of the authorized devices are one by one attached to the network. Each of these mappings, $Cr_i$, may then be stored in the database as explained above with respect to FIG. 1.

Network Port Locking Process

Referring back to FIG. 3, the network port locking process 304 configures a network port, to allow use of the network resources by successfully mapped equipment interface MAC addresses only. This results in denying access to all other interfaces that are deemed to be violators. If a violation is encountered, a port may be configured to shutdown. Additionally, the MAC addresses of violators may be detected on the ports, and can be tracked through the use of violator credentials 320 that are written to a database for subsequent usage.

Violator Credentials

A network interface that does not successfully map into an expected, interface credential structure is a violator. The mismatch may occur in one of several ways. For example, the hostname obtained from the interface may not match a DNS name obtained from the ARP cache. Alternatively, the configured or actual IP address does not match an expected IP address of record. The mismatch may be deduced with the detection of the MAC address seen on the port. In other words:

$SV_i = \{\text{DNS Name}_j, \text{IP Address}_i, \text{MAC Address, Network Port}_i\}$ is a violator credential such that IP Address$_i$ belongs to $AC_i$ but does not belong to $EC_i$ and MAC Address$_j$ from $AC_j =$ MAC Address$_r$ from $P_r$.

Note that a violator may be detected by the methodology either prior to all authorized devices having been authenticated (and their ports locked), or after all authorized devices and their ports have been locked down (see FIG. 5 described below).

The DNS name may be nonexistent or null. After a successful mapping of expected credentials, and the lockdown of ports with the expected credentials, any other interface that seeks to connect to that port may be deemed a violator. In that situation, only the MAC address of the violator may be registered (and added as a violator credential 320). The system may keep a list of the violator MAC addresses that have been seen on each port, once that port has been successfully mapped. This information may be reported to the network administrator, using the reporting and notification process 316, to evaluate how often an unauthorized device sought access to the network via that port.

Figure 4:
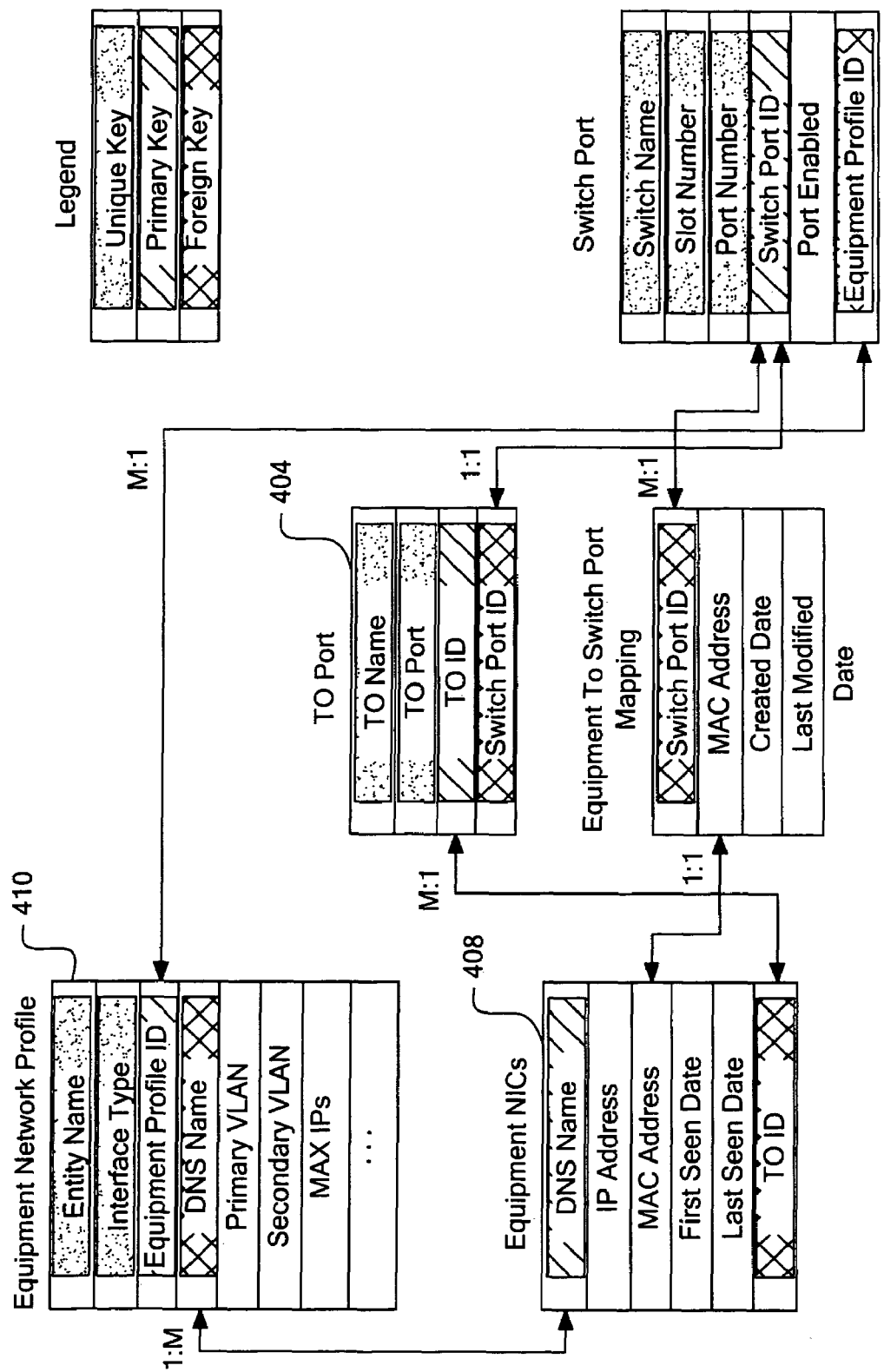
FIG. 4 is an entity relation diagram for the network port locking system.

The above-described data structure may result in the entity relation diagram shown in FIG. 4. Note the link between the network port 404, the equipment interface (network interface controller, NIC) 408, and the equipment profile 410. In this example, a TO Port is a standard passive Ethernet socket attached to a wall or within a floor. The TO port in turn connects to a switch typically located in a network facility that is not physically accessible to users for security reasons. Still referring to FIG. 4, the expression 1:1 represents a one-to-one relationship, m:1 represents a many to one relationship and 1:m represents a 1 to many relationship. A network is a shared resource with many ports, each port being associated typically with a single computer interface. The relationship expression for a credential of an interface and the interface itself should be 1:1 to assure security.

Figure 5:
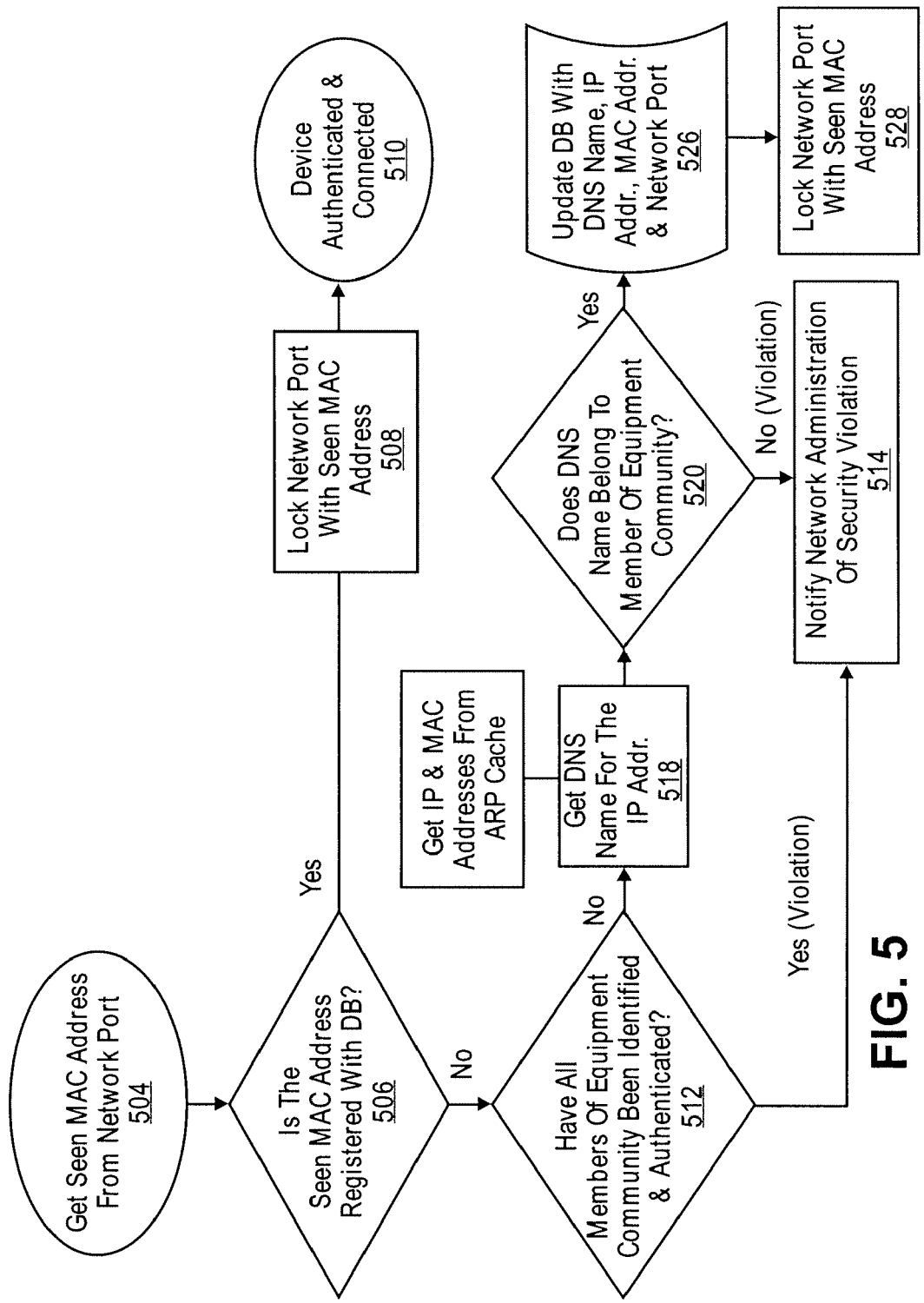
FIG. 5 is a flow chart of an example network port security methodology.

Turning now to FIG. 5, a flow diagram of a network port security locking methodology according to an embodiment of the invention is shown. Operation begins with obtaining from the network port that has been assigned to an equipment interface, through which the device is seeking to connect to the network of a community, a seen MAC address (operation 504). Next, in operation 506, a determination is made as to whether the MAC address is registered with the database 136 of expected credentials 130 (see FIGS. 1 and 2). If yes, then the attached device has been authenticated and the network port is locked with the seen MAC address without any further checking needed (operation 508). The device is now connected to the network (operation 510). On the other hand, if the seen MAC address is not registered with the database, then further inquiries are made. In particular, a determination is made as to whether all members of the equipment community have been identified and authenticated (operation 512). If so, then the MAC address is a violation, and the network administrator should be notified of a security violation (operation 514).

On the other hand, if all members of the community have not yet been identified and authenticated, then a determination is made as to whether the DNS name that corresponds to the seen MAC address (and its associated IP address) belongs to a member of the community (operation 520). At some point prior to operation 520, the DNS name for the IP address of the equipment interface should be obtained, e.g. from an ARP cache (operation 518). If the obtained DNS name belongs to a member of the equipment community (e.g., as determined by comparing with DNS names obtained from the expected list and the IP address identified on the network), then the database 136 is updated, with the DNS name, IP address, MAC address, and network port, to fill the network credential that is assigned to this equipment interface (operation 526).

In addition, the network port with the seen MAC address is locked, so that the device with that MAC address may be allowed to access the network through that port, and not any other MAC address (operation 528).

It should be noted that it is administratively tedious to accurately obtain the MAC addresses of the expected devices in a manual fashion. To do so, each computer or piece of equipment that is attached to the network needs to be turned on, and then a command is manually typed, to get the MAC address. Then, the MAC addresses may be entered into a database, again through a manual typing process. Each MAC address may have 6 bytes in hexadecimal format. The entering such information may be error prone. According to an embodiment of the invention, the software is to automatically detect the MAC addresses on a network switch where the devices connect to the network, and use the TCP/IP system to match the detected MAC addresses to the expected list of DNS names.

Figure 6:
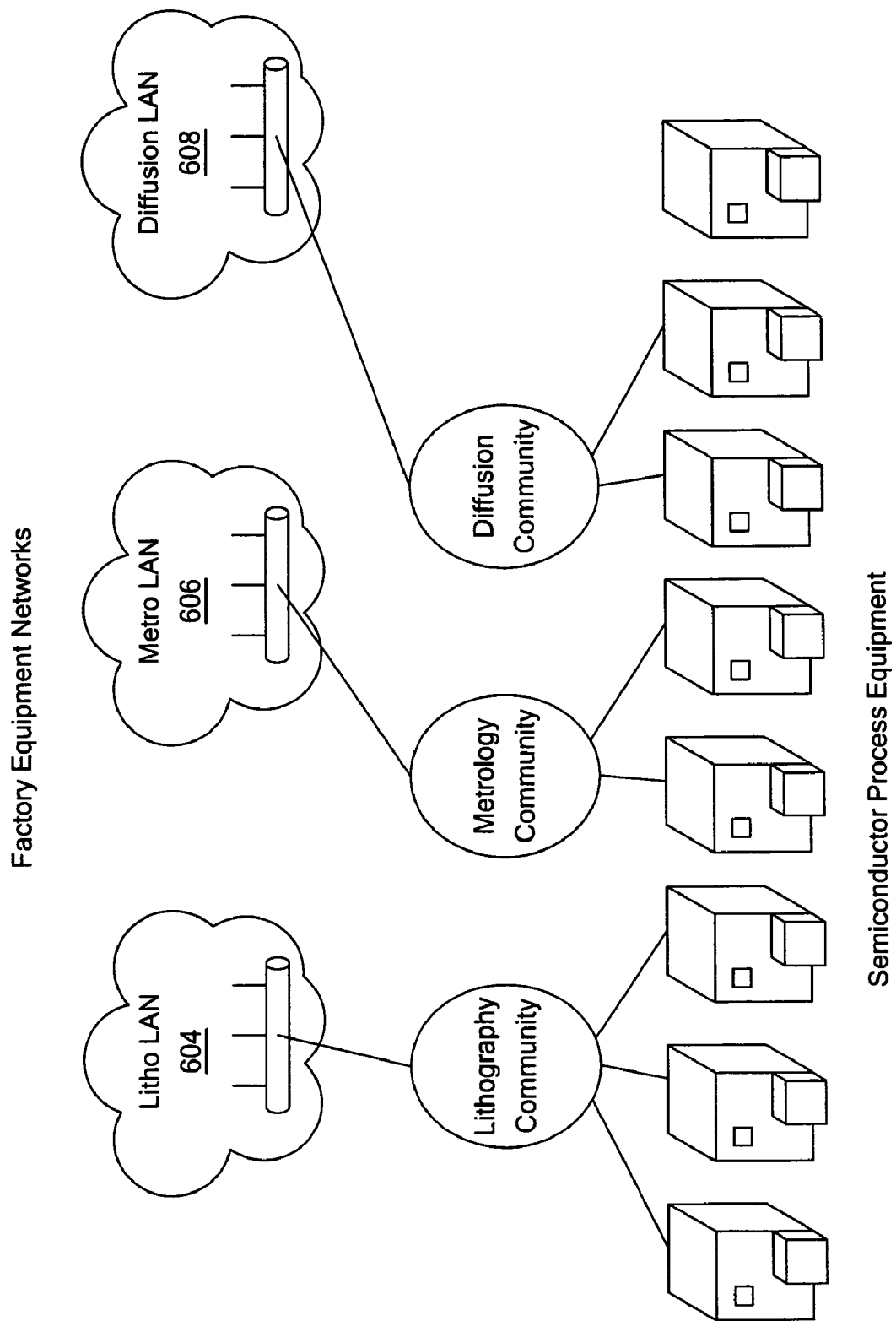
FIG. 6 shows an integrated circuit semiconductor manufacturing environment in which an embodiment of the invention may be implemented.

Referring now to FIG. 6, FIG. 6 shows an integrated circuit semiconductor manufacturing system environment in which an embodiment of the invention may be implemented. This is an example of a manufacturing environment, and in particular an integrated circuit fabrication environment, in which the software and methodology described above for network security may be deployed. In this example, there are large number of communities of computers, but only three are illustrated, namely a lithography LAN 604, a metrology LAN 606, and a diffusion LAN 608. Each of these networks provides support for different areas of integrated circuit manufacturing tasks, in this case that of lithography, metrology, and diffusion. The security challenge is to ensure that only authorized computers connect to each LAN and participate in the community activities. An immediate challenge here is that it is infeasible to update the legacy hardware and operating systems, within a large number of semiconductor manufacturing equipment environment, to more current network security protocols, such as IEEE 802.1x. Instead, the software approach described above may be implemented at a relatively low cost to secure the hundreds of pieces of equipment that are connected to the factory networks without having to upgrade the legacy hardware and operating systems. The solution described here is also scaleable as it could be easily applied to larger numbers of communities via software automation.

An embodiment of the invention may be a machine readable medium having stored thereon instructions which program a processor to perform some of the operations described above. In other embodiments, some of these operations might be performed by specific hardware components that contain hardwired logic. Those operations might alternatively be performed by any combination of programmed computer components and custom hardware components.

A machine-readable medium may include any mechanism for storing or transmitting information in a form readable by a machine (e.g., a computer), not limited to Compact Disc Read-Only Memory (CD-ROMs), Read-Only Memory (ROMs), Random Access Memory (RAM), Erasable Programmable Read-Only Memory (EPROM).

The invention is not limited to the specific embodiments described above. Although the grouping of the communities shown in FIG. 6 is based on servicing distinct parts of a manufacturing process sequence, an alternative is to group them according to the intellectual property that they service (e.g., a community of machines working on a processor core, while another is working on an I/O subsystem), or in accordance with different levels of network security desired. Accordingly, other embodiments are within the scope of the claims.

What is claimed is:

1. A system comprising:

a detection module, stored in a non-transitory memory, executed by a processor to automatically detect a MAC address of an equipment interface that is attached to a network port used to connect to a local area network, and determine whether the detected MAC address matches an expected value for said local area network and if so then lock the network port with said detected MAC address and if not then check whether all members of an equipment community that are authorized to connect to the local area network have been detected and authenticated and if all members of the equipment community that are authorized to connect to the local area network have been detected and authenticated then track the equipment interface as a violator, by writing the violator's credentials to a database for subsequent usage, the detection module to store a credential, for each authorized equipment interface that is authorized to connect to the local area network and that has been authenticated, which contains a lower layer address, a network layer address, a domain name, and a network port identifier that identifies a network port to which the authorized equipment interface is currently attached.

2. The system of claim 1 wherein the detection module is to treat the local area network as part of a high volume manufacturing environment.

3. The system of claim 1 wherein if all members of the equipment community have not been detected and authenticated, then the detection module is to get a corresponding DNS name for an IP address of the equipment interface and then check whether the DNS name belongs to a member of the equipment community and if so then update a stored credential of the equipment interface with the DNS name, IP address, MAC address and an identifier of the network port.

4. The system of claim 1 wherein if all members of the equipment community have been detected and authenticated, then the detection module is to notify a network administrator of a security violation involving the MAC address and the network port.

5. The system of claim 1 wherein the detection module has knowledge of a plurality of credentials assigned to a plurality of expected devices, respectively, each credential includes a domain name, a network layer address, a lower layer address and a network port identifier for its respective, expected device, the detection module to automatically identify each of the expected devices as authorized to access the local area network and lock a respective network port to the credential of each of the expected devices.

6. The system of claim 1 wherein the detection module is to implement a network port locking process, a plurality of network credentials, and a credential detection and mapping process, each of the network credentials represents a respective equipment interface that is authorized to connect to the local area network, the credential detection and mapping process to automatically obtain information about an equipment interface that is to be connected to the local area network, using a Transport Control Protocol/Internet Protocol network system, and on that basis add additional information to the network credential for said equipment interface, the network port locking process to lock a respective network port to the network credential of an equipment interface that is seeking to connect to the local area network via said respective network port and that has been authenticated by the credential detection and mapping process.

7. An article of manufacture comprising:

a non-transitory computer-readable medium encoded with instructions that when executed by a computer cause a system to secure from unauthorized access an equipment network being a local area network having equipment members that do not comply with IEEE 802.1x capabilities for controlling access to a network, the system to determine whether an automatically detected Internet Protocol (IP) address and a Medium Access Control (MAC) address of an interface of equipment that is to be connected to the equipment network match expected values for the network, and in response to a match fill a network credential data structure that is assigned to said equipment interface, with the IP address, a Domain Name Service (DNS) name associated with the IP address, the MAC address, and a network port identifier and if no match and if all members of an equipment community that are authorized to connect to the local area network have been detected and authenticated then track the equipment interface as a violator, by writing the violator's credentials to a database for subsequent usage.

8. The article of manufacture of claim 7 wherein the equipment interface is to be connected to the network via a network port that is identified by the network port identifier, the instructions to cause the system to lock the network port to said equipment interface in response to determining that the IP address and MAC address of said equipment interface match the expected values.

9. The article of manufacture of claim 8 wherein the instructions are to cause the system to secure from unauthorized access the equipment network that is in a high volume manufacturing plant.

10. The article of manufacture of claim 7 wherein the instructions are to cause the system to secure from unauthorized access the equipment network that is part of an integrated circuit fabrication plant.

11. The article of manufacture of claim 7 wherein the instructions are to cause the system to obtain the DNS name by looking up one of the IP addresses and MAC addresses in an Address Resolution Protocol (ARP) table, and write the network credential data structure to a separate database that is to contain credentials of all authorized devices in the network.

12. A method for securing an equipment community, comprising:

determining whether a MAC address, obtained from a network port through which equipment interface is seeking to connect to a local area network of the equipment community, is registered in a database;

if the MAC address is not registered, determining whether all members of the equipment community have been identified and authenticated;

if not all members have been identified, determining whether a domain name associated with the equipment interface belongs to a member of the equipment community; and if so, updating the database to associate the domain name, a network layer address, the MAC address and a network port identifier with said equipment interface if the domain name associated with the equipment interface does not belong to a member of the equipment community and if all members of the equipment community that are authorized to connect to the local area network have been detected and authenticated, track the equipment interface as a violator.

13. The method of claim 12 further comprising;
allowing the equipment interface to connect to the local area network via said network port, if the obtained MAC address is determined to be registered in the database.

14. The method of claim 13 further comprising:
notifying a network administrator of a security violation if (1) all members of the equipment community have been identified and authenticated and (2) it is determined that the obtained MAC address is not registered in the database.

15. The method of claim 12 further comprising:
obtaining the network layer address from an Address Resolution Protocol (ARP) cache; and
obtaining the domain name from a Domain Name Service (DNS) using the network layer address.

16. The method of claim 15 further comprising:
updating a credential of the equipment interface with the domain name, network layer address, MAC address and network port identifier, if the domain name belongs to the member of the community.

17. The method of claim 12 further comprising:
locking the network port with the obtained MAC address.

18. The method of claim 12 wherein the equipment community is in a manufacturing environment.

19. The method of claim 12 wherein the equipment community is in an integrated circuit fabrication environment.

20. The method of claim 12 wherein the network layer address is an Internet Protocol address.

* * * * *

UNITED STATES PATENT AND TRADEMARK OFFICE
CERTIFICATE OF CORRECTION

| | | |
|---|---|---|
| PATENT NO. | : 7,733,906 B2 | Page 1 of 1 |
| APPLICATION NO. | : 11/170854 | |
| DATED | : June 8, 2010 | |
| INVENTOR(S) | : Raman et al. | |

It is certified that error appears in the above-identified patent and that said Letters Patent is hereby corrected as shown below:

In the Claims:

In column 10, claim 12, at line 61 delete , "if so, updating the database to associate the domain name, a network layer address, the MAC address and a network port identifier with said equipment interface if the domain name associated with the equipment interface does not belong to a member of the equipment community and if all members of the equipment community that are authorized to connect to the local area network have been detected and authenticated, track the equipment interface as a violator." and insert --if the domain name associated with the equipment interface does belong to a member of the equipment community and all members of the equipment community that are authorized to connect to the local area network have not been detected and authenticated, updating the database to associated the domain name, a network layer address, the MAC address and network port identifier with said equipment interface; if the domain name associated with the equipment interface does not belong to a member of the equipment community and if all members of the equipment community that are authorized to connect to the local area network have been detected and authenticated, track the equipment interface as a violator, by writing the violator's credentials to a database for subsequent usage--.

Signed and Sealed this
Fifth Day of April, 2011

David J. Kappos
*Director of the United States Patent and Trademark Office*